(12) United States Patent
Kahle et al.

(10) Patent No.: US 6,693,706 B2
(45) Date of Patent: Feb. 17, 2004

(54) LASER REFERENCE SYSTEM AND METHOD OF DETERMINING GRADE RAKE

(75) Inventors: Kent W. Kahle, Tipp City, OH (US); James T. Zalusky, Beavercreek, OH (US); Francisco R. Green, Dayton, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 10/041,190

(22) Filed: Jan. 8, 2002

(65) Prior Publication Data

US 2003/0128357 A1 Jul. 10, 2003

(51) Int. Cl.⁷ .............................. G01B 11/26; G01C 3/08
(52) U.S. Cl. ................. 356/141.3; 356/4.08; 356/141.4
(58) Field of Search .......................... 356/4.08, 141.3, 356/141.4

(56) References Cited

U.S. PATENT DOCUMENTS

| | | | |
|---|---|---|---|
| 4,035,084 A | * | 7/1977 | Ramsay |
| 4,976,538 A | | 12/1990 | Ake |
| 5,196,900 A | * | 3/1993 | Pettersen |
| 5,844,679 A | | 12/1998 | Detweiler et al. |
| 5,852,493 A | | 12/1998 | Monnin |
| 5,886,776 A | | 3/1999 | Yost et al. |
| 5,898,490 A | * | 4/1999 | Ohtomo et al. ........... 356/141.3 |
| 5,976,536 A | | 11/1999 | Stephens et al. |
| 6,043,874 A | * | 3/2000 | Detweiler ................ 356/141.1 |
| 6,055,046 A | | 4/2000 | Cain |

\* cited by examiner

*Primary Examiner*—Stephen C. Buczinski
(74) *Attorney, Agent, or Firm*—Dinsmore & Shohl LLP (57) ABSTRACT

A laser reference system orients a reference plane of laser light generated by a transmitter so compensation is made for a rake angle between the first and second axes of the transmitter and an alignment axis and an axis perpendicular thereto. The transmitter includes an optical system arranged to generate a laser beam, the optical system projecting said laser beam radially along a rotational arc defined about a central rotational axis, thereby substantially defining a reference plane of laser light, and a positioning arrangement, coupled to said optical system, for adjusting the angular orientation of the optical system with respect to a first transmitter axis and with respect to a second transmitter axis. A detector is arranged to detect reception of the laser beam. The detector includes a generally vertically arranged row of detector elements. The detector further includes a transmitter for transmitting information regarding the location of said laser beam, as detected by said detector elements. The system further includes a processor adapted to receive said transmitted information from said detector regarding the location of the laser beam. The processor calculates the rake angle between the first transmitter axis and the alignment direction.

32 Claims, 4 Drawing Sheets

LASER REFERENCE SYSTEM AND METHOD OF DETERMINING GRADE RAKE

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention relates generally to a laser transmitter and, more particularly, to a laser reference system and method of orienting a reference plane of laser light generated by a laser transmitter. The laser transmitter is effectively aligned so that the laser transmitter defines a plane having desired slopes in a desired alignment direction and in a direction perpendicular thereto.

Laser light systems have been employed in numerous prior art surveying and construction applications. In one type of system, a laser light transmitting device provides a rotating laser beam which establishes a reference plane. Typically, the reference plane creates either a constant horizontal bench mark of elevation, or an appropriately tilted reference over a work site. The laser light is either detected by the naked eye or by one or more laser beam detectors, placed at considerable distances from the transmitting device or mounted on construction equipment that is operated at the work site.

Prior to operation, it is necessary to set up the transmitting device at the work site in proper orientation to the work site. As an example, assume that an architect has previously determined that the work site is to slope in a certain direction at a certain grade. Assume further that the work site is rectangular, and that a corner of the work site is selected as the origin of a coordinate system, with one edge of the rectangle being the x-axis and the other edge of the rectangle being the y-axis. The desired fall line may extend in a direction between the x-axis and y-axis. The architect will have specified an x-axis slope and a y-axis slope for the work site that together produce the desired slope along the fall line.

The transmitter is placed at the corner of the work site that constitutes the origin. The transmitter has its own internal x-axis and y-axis, and these are marked on the top of the transmitter. The operator manually lines up the transmitter x and y axes with the work site x and y axes using the markings, or using a telescope that may be mounted on the top of the device for this purpose. Neither of these arrangements for aligning a transmitter permit great precision If the transmitter were to be perfectly aligned such that its x-axis and its y-axis were parallel to the x-axis and y-axis of the work site, respectively, then when the operator inputted the x-axis grade and the y-axis grade, the transmitter would produce a reference plane of light having the correct pitch along the fall line. A problem develops, however, when the x-axis and the y-axis of the transmitter are misaligned, i.e., pivoted slightly clockwise or counterclockwise, as seen from above, with respect to the x-axis and y-axis of the work site. If the transmitter is misaligned and if the operator inputs the desired work site axes slopes, the transmitter will produce a reference light plane having the correct pitch, but the maximum pitch of the reference plane will not be aligned with the desired fall line. Instead, the reference plane will be rotated slightly about a vertical axis from the orientation that is desired.

The present invention determines the amount of that misalignment about a vertical axis (termed "the rake angle") and then compensates for it. Stated another way, the grade rake angle is the angular misalignment (as seen from above) of the x and y axes of the transmitter, and the x and y axes of the work site, respectively. The present invention determines this rake angle and alters the operation of the transmitter such that a properly oriented reference plane is produced.

One system for aligning a transmitter to a work site is shown in U.S. Pat. No. 6,055,046, issued Apr. 25, 2000, to Cain, and assigned to the assignee of the present invention. The Cain patent discloses a transmitter that includes an angle encoder. The angle encoder continuously indicates the angular orientation of the rotating beam. The transmitter and a retroreflective target are positioned along a side of the work site, spaced apart in the direction to which the laser transmitter is to be aligned. The angular orientation of the target is then determined by the angle encoder output when light is reflected from the target back to the transmitter. Alternatively, as shown in the Cain patent, an electro-optical detector may be used with the detector, sending a signal via a radio or other transmitter back to a receiver on the transmitter when the beam is detected. In either event, the transmitter axes are rotated into alignment electronically. This arrangement requires an accurate angle encoder, thus adding to the expense and complication in the construction of the device.

Accordingly, it is seen that there is a need for an improved and simplified system for aligning a laser transmitter to a work site, such that a plane of laser light projected from the laser transmitter accurately defines a reference plane with a properly oriented slope.

SUMMARY OF THE INVENTION

This need is met by a laser reference system according to the present invention, which includes a laser transmitter, a detector, and a processor. The transmitter has an optical system that is arranged to generate a laser beam. The optical system projecting the laser beam radially along a rotational arc defined about a central rotational axis, thereby substantially defining a reference plane of laser light; and a positioning arrangement, coupled to the optical system, for adjusting an angular orientation of the optical system with respect to a first transmitter axis and with respect to a second transmitter axis. The detector is arranged to detect reception of the laser beam, and generally includes a vertically arranged row of detector elements, and a transmitter for transmitting information regarding the location of the laser beam, as detected by the detector elements. A processor is adapted to receive the transmitted information from the detector regarding the location of the laser beam. The processor is arranged to determine the distance in an alignment direction from the transmitter to the detector, determine the distance from the detector to the first transmitter axis in a direction generally perpendicular to the alignment direction, and calculate the rake angle between the first transmitter axis and the alignment direction. The rake angle is calculated as the arctangent of the ratio of the distance from the detector to the first transmitter axis in a direction generally perpendicular to the alignment direction, to the distance in an alignment direction from the transmitter to the detector.

The transmitter includes an input for inputting a first desired slope for the reference plane of laser light in the alignment direction and a second desired slope in a direction perpendicular thereto. The processor is further adapted to calculate a first calculated slope and a second calculated slope based on the calculated rake angle.

The processor determines the distance in the alignment direction between the transmitter and the detector by directing the beam in succession to illuminate two detector elements spaced vertically along the row, determining the included vertical angle of the reference plane as it shifts from illuminating one of the two detector elements to illuminating the other of the two detector elements, and computing the distance from the transmitter to the detector based on the height difference between the two detector elements and the included vertical angle.

The processor is adapted to determine the distance from the detector to the first transmitter axis in a direction generally perpendicular to the alignment direction by the steps of illuminating the center of the row of elements with the reference plane horizontal in the direction of the second transmitter axis, tilting the reference plane in the direction of the second transmitter axis until a detector element, vertically displaced from the center of the row of elements, is illuminated, determining the angle by which the reference plane is tilted in the direction of the second transmitter axis, and computing the distance from the detector to the first transmitter axis in a direction generally perpendicular to the alignment direction based on the height difference between the center of the row of elements and detector element that is vertically displaced from the center of the row of elements, and on the angle by which the reference plane is tilted.

A method according to the present invention of orienting a reference plane of laser light generated by a transmitter, the transmitter including a positioning arrangement that adjusts the angular orientation of the reference plane with respect to a first transmitter axis and with respect to a second transmitter axis perpendicular thereto, the laser light being detected along a generally vertical detector line defined by a detector, with the detector also including a transmitter that transmits information regarding the location of the laser light, comprises the steps of: determining the distance in an alignment direction from the transmitter to the detector; determining the distance from the detector to the first transmitter axis in a direction generally perpendicular to the alignment direction; and calculating the rake angle between the first transmitter axis and the alignment direction.

The step of determining the distance in an alignment direction from the transmitter to the detector may comprise the steps of directing the light in succession to illuminate two points spaced vertically along the detector line, determining the included vertical angle of the reference plane as it shifts from illuminating one of the two points to illuminating the other of the two points, and computing the distance from the transmitter to the detector based on the height difference between the two points and the included vertical angle.

The step of determining the distance from the detector to the first transmitter axis in a direction generally perpendicular to the alignment direction may comprise the steps of: illuminating the center of the detector line with the reference plane horizontal in the direction of the second transmitter axis; tilting the reference plane in the direction of the second transmitter axis until a point on the detector line, vertically displaced from the center of the detector line, is illuminated; determining the angle by which the reference plane is tilted in the direction of the second transmitter axis; and computing the distance from the detector to the first transmitter axis in a direction generally perpendicular to the alignment direction based on the height difference between the center of the detector line and the point on the detector line that is vertically displaced from the center of the detector line, and on the angle by which the reference plane is tilted. The step of calculating the rake angle between the first transmitter axis and the alignment direction may comprise the step of determining the arctangent of the ratio of the distance from the detector to the first transmitter axis in a direction generally perpendicular to the alignment direction to the distance in an alignment direction between the transmitter and the detector.

Alternatively, a method of orienting a reference plane of laser light generated by a transmitter, the transmitter including a positioning arrangement that adjusts the angular orientation of the reference plane with respect to a first transmitter axis and with respect to a second transmitter axis perpendicular thereto, the laser light being detected along a generally vertical detector line defined by a detector, with the detector also including a transmitter that transmits information regarding the location of the laser light, includes the steps of: defining an alignment direction from the transmitter by positioning a detector in the alignment direction for illumination with the plane of laser light; tilting the reference plane in a direction of the first transmitter axis while keeping the plane horizontal in a direction of the second transmitter axis; effectively rotating the plane of laser light such that a predetermined point on the detector line is illuminated at two effective angular positions of rotation of the plane; determining a mid-point between the two effective angular positions as the first transmitter axis, and determining an angular position at ninety degrees thereto as the second transmitter axis; determining the angular difference between the alignment direction and the first transmitter axis as a rake angle; and orienting the reference plane with respect to the first and second transmitter axes such that a desired orientation with respect to the alignment direction and a direction perpendicular thereto is achieved.

As another alternative, a method of orienting a reference plane of laser light may comprise the steps of: defining an alignment direction from the transmitter by positioning a detector in the alignment direction for illumination with the plane of laser light; tilting the reference plane and determining a grade $x_1$ in a direction of the first transmitter axis and a grade $y_1$ in a direction of the second transmitter axis which cause a point on the generally vertical detector line to be illuminated; tilting the reference plane and determining a grade $x_2$ in a direction of the first transmitter axis and a grade $y_2$ in a direction of the second transmitter axis which cause a point on the generally vertical detector line to be illuminated; calculating the rake angle between the first transmitter axis and the alignment direction; and orienting the reference plane with respect to the first and second transmitter axes such that a desired orientation with respect to the alignment direction and a direction perpendicular thereto is achieved.

The step of calculating the rake angle $\theta$ between the first transmitter axis and the alignment direction includes the step of calculating the rake angle according to the equation:

$$\theta = arctan((y_1-y_2)/(x_1-x_2)).$$

Alternatively, this may be calculated according to the equation:

$$\theta = arctan(-(x_1-x_2)/(y_1-y_2)).$$

The step of orienting the reference plane with respect to the first and second transmitter axes such that a desired orientation with respect to the alignment direction and a direction perpendicular thereto is achieved, may comprise the step of orienting the reference plane with respect to the first and second transmitter axes according to the equations:

$x=x' \cos(\theta)-y' \sin(\theta)$, and $y=x' \sin(\theta)+y' \cos(\theta)$.

In these equations, x' and y' represent the desired grades in the alignment direction and a direction perpendicular thereto, and x and y represent the grades in the first and second transmitter axes.

Accordingly, it is an object of the present invention to provide a laser transmitter that produces a plane of laser light having a first desired slope in an alignment direction and a second desired slope in a direction perpendicular thereto; and to provide a laser transmitter in which the grade rake angle is determined and compensation for the grade rake angle provided.

DETAILED DESCRIPTION OF THE PREFERRED EMBODIMENTS

Figure 1:
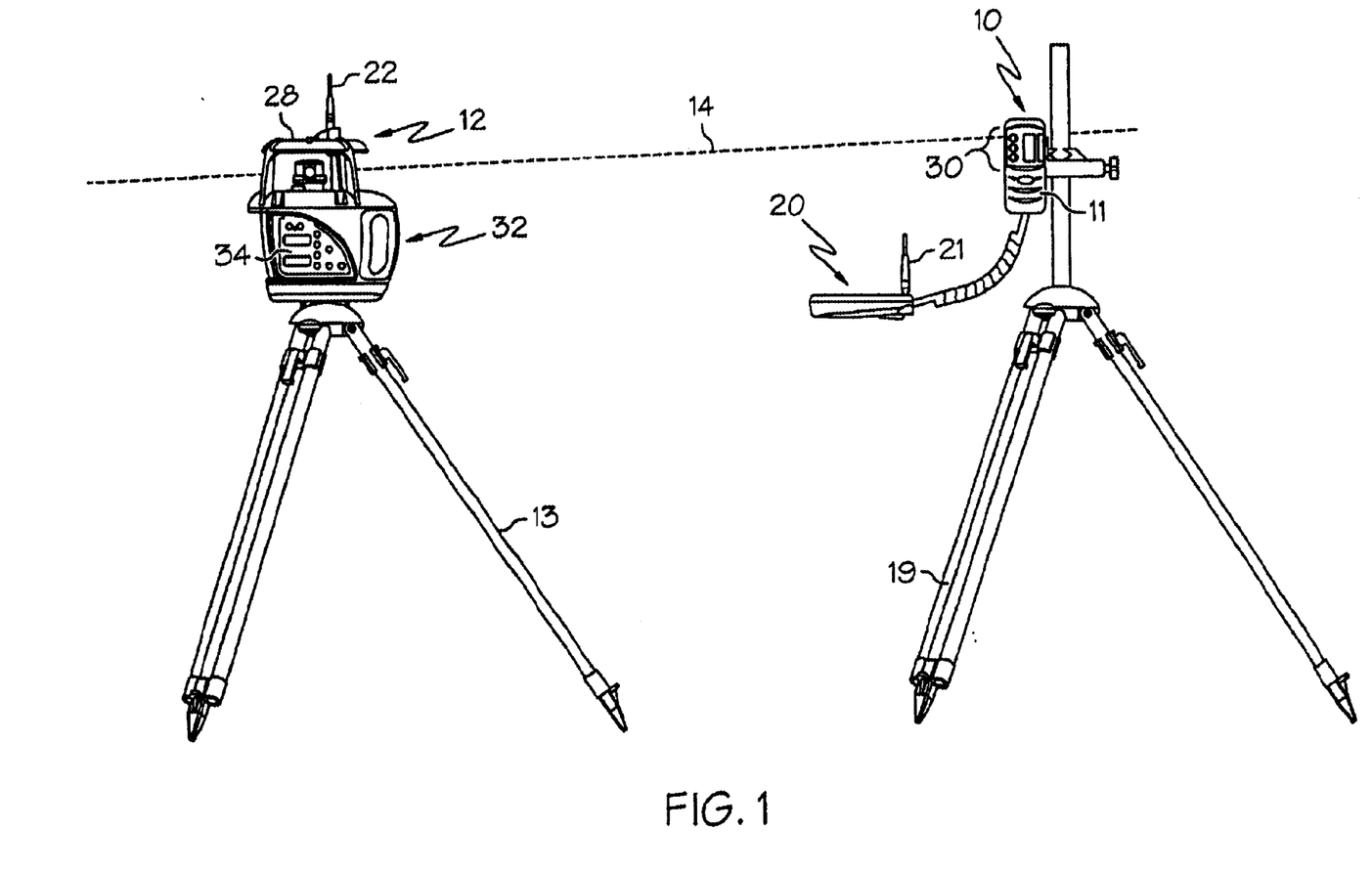
FIG. 1 is a view of the laser reference system of the present invention, as seen from the side.
Figure 2:
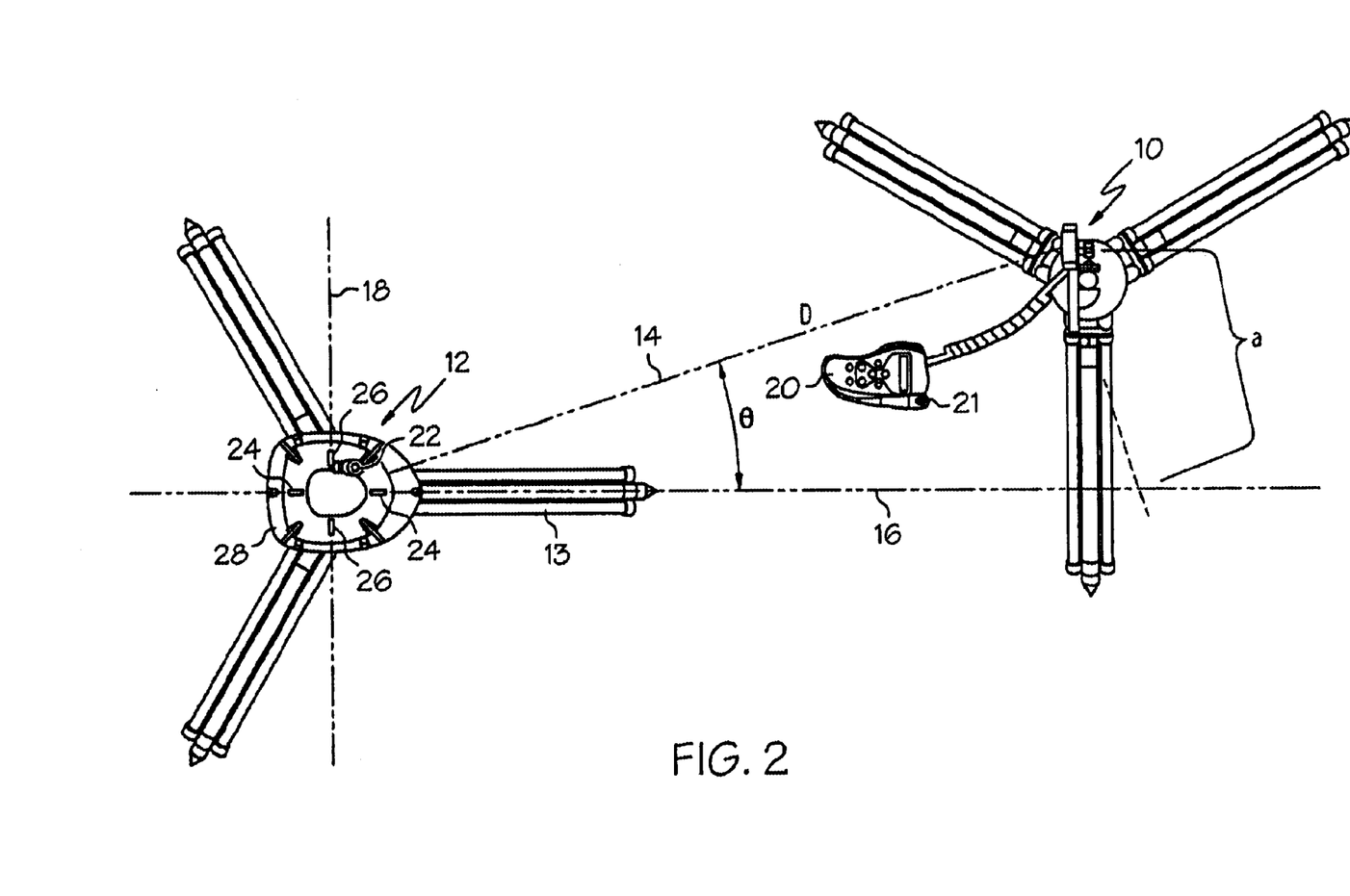
FIG. 2 is a view of the laser reference system of FIG. 1, as seen from above.

Reference is now made to FIGS. 1 and 2 of the drawings, which illustrate the laser reference system of the present invention. Shown are a detector 10, including a laser light receiver or detector 11, and a transmitter 12. The transmitter 12, mounted on tripod support 13, includes an optical system arranged to generate a laser beam, indicated by reference numeral 14. The optical system projects the laser beam radially along a rotational arc defined about a central rotational axis, thereby substantially defining a reference plane of laser light. The optical system preferably includes a rotating pentaprism mechanism which insures that the radially directed beam of laser light is maintained precisely within a desired plane. Such an arrangement generally of this type is shown, for example, in U.S. Pat. No. 5,852,493, issued Dec. 22, 1998 to Monnin, and assigned to the assignee of the present invention. The Monnin patent is incorporated herein by reference.

The transmitter 12 includes a positioning arrangement, coupled to said optical system, for adjusting an angular orientation of the optical system with respect to a first transmitter axis 16 and with respect to a second transmitter axis 18. Transmitter axis 16 is perpendicular to transmitter axis 18. The detector 10, mounded on tripod support 19, further includes a hand-held remote control transmitter 20 which transmits instructions and information from its remote location to an appropriate receiver in the transmitter 12 via antennae 21 and 22. The transmitter 20 is illustrated as a radio transmitter. Any suitable form of transmission may be used, however. Markings 24 and 26 are included on the top of the sunshade 28 to permit an initial rough alignment of the transmitter 12.

The detector 10 is arranged to detect reception of the laser beam 14. The detector 10 includes a generally vertically arranged row of detector elements such as shown in U.S. Pat. No. 5,886,776, issued Mar. 23, 1999, to Yost, assigned to the assignee of the present invention, or other arrangement, such as the pair of triangular photodetectors shown in U.S. Pat. No. 4,976,538, issued Dec. 11, 1990, to Ake, and assigned to the assignee of the present invention. The Yost and Ake patents are incorporated herein by reference. The detector 10 is arranged to detect reception of said plane of laser light 16 along a generally vertical detector line extending generally along the edge 30 of the detector. The detector then transmits information regarding the location of the laser beam 14 to a processor 32 in the transmitter 12.

Figures 3A, 3B:
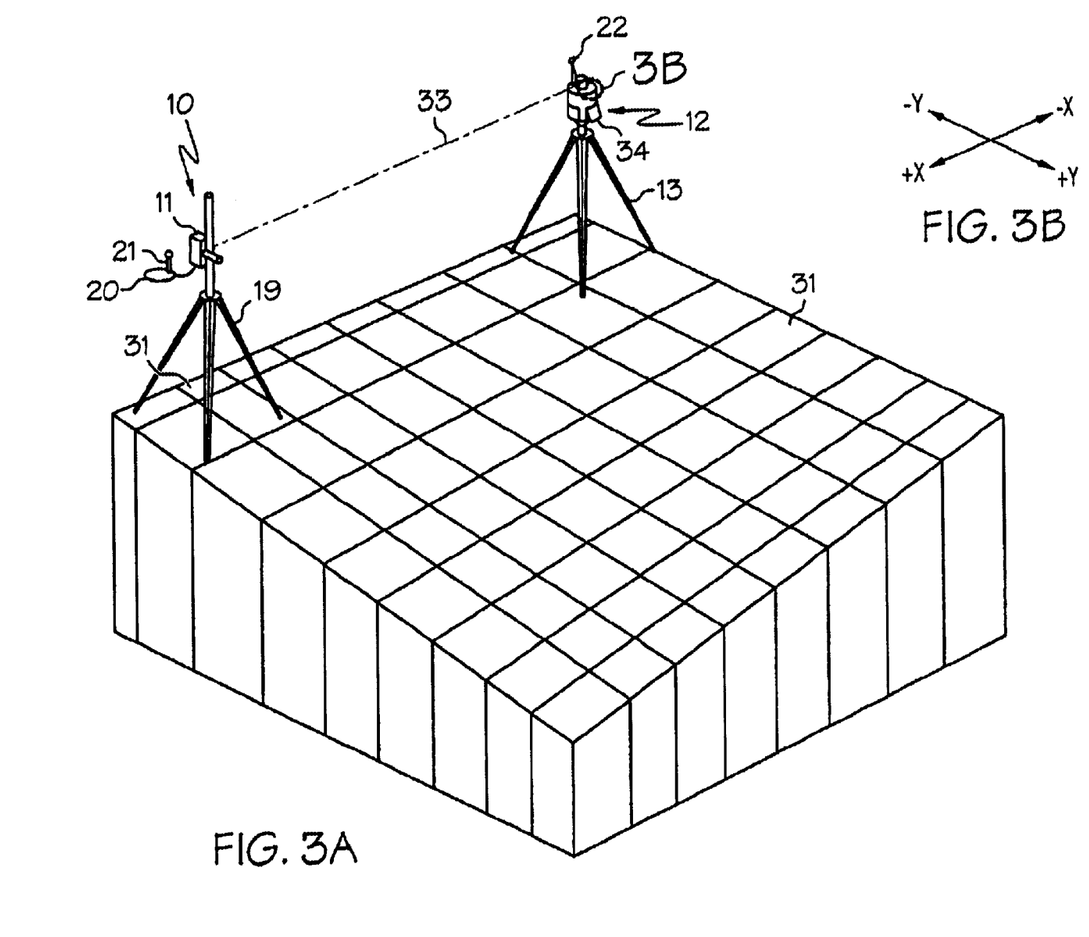
FIG. 3A is a schematic perspective view, illustrating a field set up of the present invention.
FIG. 3B illustrates the orientation of the x and y axes of the transmitter of FIG. 3A.
Figure 4:
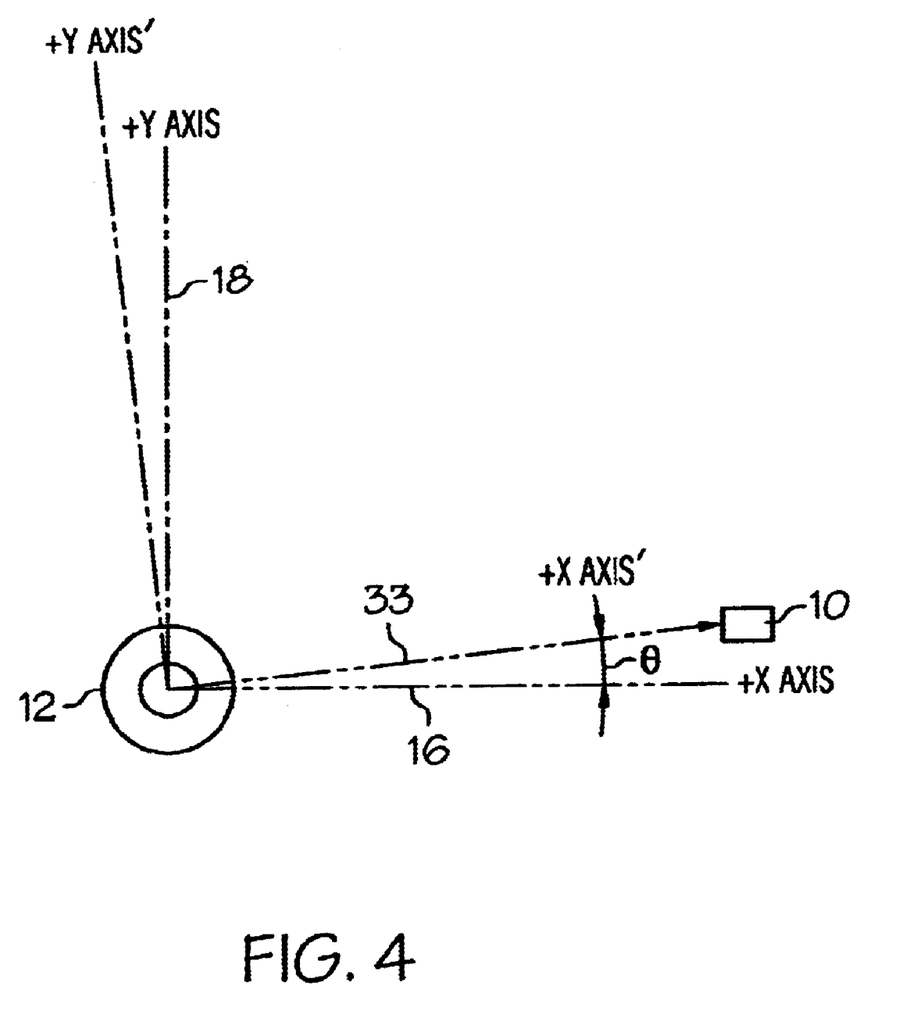
FIG. 4 is a schematic plan view of a transmitter and detector, illustrating the grade rake angle θ of the transmitter.

As seen in FIGS. 3A and 3B, the transmitter 12 and the detector 10 are positioned at a work site 31 along a line which may be termed the alignment direction 33. The alignment direction is fixed with respect to the specific worksite. Every transmitter projects a beam with respect to first and second transmitter axes, indicated as axes x and y in FIG. 3B, respectively. When the operator of the transmitter 12 inputs previously determined pitch or slope angles, these angles are given for the alignment direction and for a direction perpendicular to the alignment direction. The angular difference θ between the alignment direction and an axis of the transmitter is termed the grade rake or rake angle, as shown in FIGS. 2 and 4.

The processor 32 is processor adapted to receive the transmitted information and arranged to determine the distance in an alignment direction between the transmitter 12 and the detector 10. The processor 32 determines the distance from said detector 10 to the first transmitter axis 16 in a direction generally perpendicular to the alignment direction, and calculates the rake angle θ between said first transmitter axis 16 and an alignment direction that extends generally from the transmitter 12 to the detector 10. It will be appreciated that if the transmitter 12 were set up perfectly at the outset, the rake angle θ would be zero and any desired pitch angle of the plane of laser light in the alignment direction and any desired pitch angle of the plane of laser light in a direction perpendicular to the alignment direction would equal the pitch angle of the plane of laser light in the direction of the first and second transmitter axes, respectively. As a consequence, it would be possible for the operator to enter the pitch angles for the two transmitter axes directly into the processor to achieve the desired orientation for the plane of laser light.

By the present invention, the rake angle θ is determined and then appropriate adjustment is made for this offset between the first and second transmitter axes, and the alignment direction and a direction perpendicular to the alignment direction, respectively. The transmitter 12 includes an input 34 for inputting a first desired slope for the reference plane of laser light in the alignment direction and a second desired slope in a direction perpendicular thereto. The processor 32 calculates a first calculated slope and a second calculated slope based on the calculated rake angle, so that the plane through which the laser beam is projected has the first desired slope in the alignment direction and the second desired slope in a direction perpendicular thereto. It will be appreciated that, if desired, the processor 32 may also be located at the detector 10, or that, if desired, the processor 32 may be located at the transmitter 12, as shown, but desired slopes entered at the detector 10 and transmitted to the transmitter 13 via the transmitter 20.

The processor 32 determines the distance in an alignment direction from the transmitter 12 to the detector 10 by directing the beam 14 in succession to illuminate two detector elements spaced vertically along the row 30. Preferably, the beam will illuminate detectors at the top of row 30, and at the bottom of the row 30. The processor 32 then determines the included vertical angle of the reference plane as it shifts from illuminating one of the two detector elements to illuminating the other of the two detector elements. The distance between the transmitter and the detector is then computed, based on the known height difference between the two detector elements and based on the included vertical angle. This distance is computed as the ratio of the known height difference to the tangent of the included vertical angle.

Next, the processor 32 determines the distance from the detector 10 to the first transmitter axis 16 in a direction generally perpendicular to the alignment direction by illuminating the center of the row of elements with the reference plane horizontal in the direction of the second transmitter axis, and tilting the reference plane in the direction of the second transmitter axis until a detector element, vertically displaced from the center of the row of elements, is illuminated. Preferably, the vertically displaced element is the top or bottom element in the row 32. The angle by which the reference plane is tilted in the direction of the second transmitter axis is then determined. Finally, the processor 32 computes the distance from the detector 10 to the first transmitter axis 16 in a direction generally perpendicular to the alignment direction based on the height difference between the center of the row of elements and detector element that is vertically displaced from the center of the row of elements, and on the angle by which the reference plane is tilted. The distance from the detector 10 to the first transmitter axis 16 is equal to the height difference between the center of the row of elements and detector element that is vertically displaced from the center of the row of elements divided by the tangent of the angle by which the reference plane is tilted. The rake angle θ is then calculated as the arctangent of the ratio of the distance a from the detector to the first transmitter axis in a direction generally perpendicular to the alignment direction, to the distance D in an alignment direction from the transmitter 12 to the detector 10.

It will be appreciated that the above description is presented in terms of a plurality of discrete detector elements positioned in a generally vertical row, and the beam of laser light being directed at the detector elements in the row 30. It will also be understood, however, that the present invention may incorporate any sort of known laser beam detection arrangement to detect the position of the beam in lieu of a row of detector elements. For example, a pair of interdigitated detector elements may be incorporated in the present invention to detect beam location. Such detector elements are shown, for example, in U.S. Pat. No. 4,976,536, issued Dec. 11, 1990, to Ake.

An alternative method may be performed according to the present invention to orient a reference plane of laser light generated by a transmitter. In this method, an alignment direction is defining from the transmitter 12 by positioning the detector 10 in the alignment direction and illuminating the detector with the plane of laser light. The reference plane defined by the rotating laser beam is then tilted in the direction of the first transmitter axis 16 while keeping the reference plane substantially horizontal in the direction of the second transmitter axis. The reference plane of laser light is then effectively rotated such that a predetermined point on the detector line is illuminated at two effective angular positions of rotation of the plane. A mid-point between the two effective angular positions is then determined as the first transmitter axis. An angular position at ninety degrees thereto is determining as the second transmitter axis. The angular difference between the alignment direction and the first transmitter axis is determined as the rake angle. Finally, taking into account the rake angle, the reference plane is oriented with respect to the first and second transmitter axes such that a desired orientation with respect to the alignment direction and a direction perpendicular thereto is achieved.

Yet another alternative method of orienting a reference plane of laser light generated by a transmitter 12 may be performed according to the present invention. As with the previously described methods, an alignment direction from the transmitter is initially defined by positioning a detector 10 in the alignment direction for illumination with the plane of laser light. The reference plane is tilted and a grade $x_1$ is determined in a direction of the first transmitter axis 16 and a grade $y_1$ is determined in a direction of the second transmitter axis 18. The selected grades $x_1$ and $y_1$ cause a point on the generally vertical detector line 30 to be illuminated with the reference plane. Next, the reference plane is titled and a grade $x_2$ is determined in a direction of the first transmitter axis 16 and a grade $y_2$ in a direction of the second transmitter axis 18 which cause the same point on the generally vertical detector line 30 to be illuminated. The rake angle θ between the first transmitter axis 16 and the alignment direction 14 is then calculated based on grades $x_1$, $x_2$, $y_1$, $y_2$. Finally, the reference plane is oriented with respect to the first and second transmitter axes such that a desired orientation with respect to the alignment direction and a direction perpendicular thereto is achieved.

The step of calculating the rake angle θ between the first transmitter axis and the alignment direction includes the step of calculating the rake angle according to the equation:

$$\theta = arctan((y_1 - y_2)/(x_1 - x_2)).$$

The step of orienting the reference plane with respect to the first and second transmitter axes such that a desired orientation with respect to the alignment direction and a direction perpendicular thereto is achieved, comprises the step of orienting the reference plane with respect to the first and second transmitter axes according to the equations:

$$x = x' \cos(\theta) - y' \sin(\theta), \text{ and}$$

$$y = x' \sin(\theta) + y' \cos(\theta),$$

where x' and y' are the desired grades in the alignment direction and a direction perpendicular thereto, and x and y are the grades in the first and second transmitter axes, as shown in FIG. 4. FIG. 4 is a schematic plan view of a transmitter 12 and detector 10, illustrating the grade rake angle θ which is the angular misalignment between the transmitter axes (+x axis and +y axis) and the axes of the work site for which the desired grades have previously been determined.

It will be appreciated that these are equations describing the rotation of axes in a plane. Here x and y are the actual orthogonal grades of the mechanical system, and x' and y' are the desired grades along the directions indicated by the rotation angle denoted by θ.

Equations for solution of the grade rake angle θ are derivable as follows. The alignment of the system has the property that the rotated coordinate of the primary axis remains constant for different cross grades. For instance, suppose we rotate the axes, choose a value for θ, to have x' aligned with a certain direction. Then, for a specific point along that direction, x' will remain constant for different values of y'. If we now pick two measurement points, using the equations above we have:

$$x_1 = x'^* \cos(\theta) - y_1'^* \sin(\theta)$$

$$y_1 = x'^* \sin(\theta) + y_1'^* \cos(\theta)$$

$$x_2 = x'^* \cos(\theta) - y_2'^* \sin(\theta)$$

$$y_2 = x'^* \sin(\theta) + y_2'^* \cos(\theta)$$

Solving these equations for x' we get:

$$(x_1 + y_1'^* \sin(\theta))/\cos(\theta) = x'$$

$$(y_1 - y_1'^* \cos(\theta))/\sin(\theta) = x'$$

$$(x_2 + y_2'^* \sin(\theta))/\cos(\theta) = x'$$

$$(y_2 - y_2'^* \cos(\theta))/\sin(\theta) = x'$$

Next, equate the two equations divided by $\cos(\theta)$ and $\sin(\theta)$ to get:

$$(x_1 + y_1'^* \sin(\theta)) = (x_2 + y_2'^* \sin(\theta))$$

$$(y_1 - y_1'^* \cos(\theta)) = (y_2 - y_2'^* \cos(\theta))$$

Or, reshuffled we get:

$$-(x_1 - x_2) = (y_1' - y_2')^* \sin(\theta)$$

$$(y_1 - y_2) = (y_1' - y_2')^* \cos(\theta)$$

It is desirable to eliminate $y_1'$ and $y_2'$:

$$\theta = \arctan(-(x_1 - x_2)/(y_1 - y_2))$$

The solution for axis alignment of the y' axis is similar to that if the x', but not identical. Using the same method as before, we can derive:

$$\theta = \arctan((y_1 - y_2)/(x_1 - x_2)).$$

Thus, as described previously, it remains to find two distinct combinations of grades $(x_1, y_1)$ and $(x_2, y_2)$ that will reflect the same grade x' along the direction of interest. More combinations of grades could lead to a better approximation of the value of the arctangent using a least squares fit or some other estimation technique.

The description above illustrated the processor 32 as resident in the transmitter. The processor 32 controls the operation of the transmitter 12 to effect the steps needed to determine and correct the rake angle θ. The processor 32 receives the data from the detector via radio transmission. It will be appreciated, however, that the processor could, if desired, be located in at the detector 10, and transmit control instructions to the transmitter 12, rather than detection data, as is the case with the described embodiments. In this respect, the location of the processor 32 is not a significant feature of the invention. It will also be appreciated that the precise manner of communication between the detector, the processor and the transmitter is also not crucial.

It will also be appreciated that the method of the present invention may be used in conjunction with a laser system of the type in which the beam of laser light is directed toward a retroreflective target which reflects the beam back to the transmitter with information regarding the relative position of the beam on the target. Such a system is shown in U.S. Pat. No. 5,844,679, issued Dec. 1, 1998, to Detweiler et al, and assigned to the assignee of the present invention. Such a system provides a target which extends generally vertically along a target line. The reflected light from the target is modulated and the modulations sensed at the transmitter to determine the location of the beam of light. The disclosure of Detweiler et al is incorporated herein by reference.

Whereas particular embodiments of the invention have been described above for purposes of illustration, it will be appreciated by those skilled in the art that numerous variations of the details may be made without departing from the invention, as described in the appended claims.

What is claimed is:

1. A laser reference system, comprising:
   a laser transmitter including
   an optical system arranged to generate a laser beam, said optical system projecting said laser beam radially along a rotational arc defined about a central rotational axis, thereby substantially defining a reference plane of laser light; and
   a positioning arrangement, coupled to said optical system, for adjusting an angular orientation of said optical system with respect to a first transmitter axis and with respect to a second transmitter axis;
   a detector arranged to detect reception of said laser beam, said detector including a generally vertically arranged row of detector elements, said detector further including a transmitter for transmitting information regarding the location of said laser beam, as detected by said detector elements; and
   a processor adapted to receive said transmitted information from said detector regarding the location of the laser beam, and arranged to:
   determine the distance in an alignment direction between said transmitter and said detector,
   determine the distance from said detector to said first transmitter axis in a direction generally perpendicular to said alignment direction, and
   calculate a rake angle between said first transmitter axis and the alignment direction.

2. The laser reference system of claim 1, in which said transmitter includes an input for inputting a first desired slope for said reference plane of laser light in said alignment direction and a second desired slope in a direction perpendicular thereto, and in which said processor is further adapted to calculate a first calculated slope and a second calculated slope based on the calculated rake angle, so that said plane through which said laser beam has projected is said first desired slope in said alignment direction and said second desired slope in a direction perpendicular thereto.

3. The laser reference system of claim 1, in which said processor is adapted to determine the distance in an alignment direction between said transmitter and said detector by:
   directing said beam in succession to illuminate two detector elements spaced vertically along said row,
   determining the included vertical angle of the reference plane as it shifts from illuminating one of said two detector elements to illuminating the other of said two detector elements, and
   computing the distance between said transmitter and said detector based on the height difference between said two detector elements and said included vertical angle.

4. The laser reference system of claim 1, in which said processor is adapted to determine the distance from said detector to said first transmitter axis in a direction generally perpendicular to said alignment direction by:
   illuminating the center of the row of elements with the reference plane horizontal in the direction of said second transmitter axis, tilting the reference plane in the direction of said second transmitter axis until a detector element, vertically displaced from the center of the row of elements, is illuminated, determining the angle by which the reference plane is tilted in the direction of said second transmitter axis, and computing the distance from said detector to said first transmitter axis in a direction generally perpendicular to said alignment direction based on the height difference between the center of the row of elements and detector element that is vertically displaced from the center of the row of elements, and on said angle by which the reference plane is tilted.

5. The laser reference system of claim 1 in which said rake angle is calculated as the arctangent of the ratio of said distance from said detector to said first transmitter axis in a direction generally perpendicular to said alignment direction to said distance in an alignment direction from said transmitter to said detector.

6. A laser reference system, comprising:

a laser transmitter including an optical system for generating a reference plane of laser light; and a positioning arrangement, coupled to said optical system, for adjusting the angular orientation of said optical system with respect to a first transmitter axis and with respect to a second transmitter axis such that the angular orientation of the reference plane of laser light is adjusted with respect to said first and second transmitter axes;

a detector for detecting reception of said plane of laser light along a generally vertical detector line, said detector further including a transmitter for transmitting information regarding the location of said laser light; and a processor, adapted to receive said transmitted information from said detector regarding the location of the laser light, and arranged to determine the distance in an alignment direction between said transmitter and said detector, to determine the distance from said detector to said first transmitter axis in a direction generally perpendicular to said alignment direction, and to calculate a rake angle between said first transmitter axis and the alignment direction.

7. The laser reference system of claim 6, in which said transmitter includes means for inputting a first desired slope for said reference plane of laser light in said alignment direction and a second desired slope in a direction perpendicular thereto, and in which said processor is further adapted to calculate a first calculated slope and a second calculated slope based on the calculated rake angle, such that said plane through which said laser light is projected has said first desired slope in said alignment direction and said second desired slope in a direction perpendicular thereto.

8. The laser reference system of claim 6, in which said processor is adapted to determine the distance in an alignment direction between said transmitter and said detector by:

directing said light in succession to illuminate two points spaced vertically along said detector line, determining the included vertical angle of the reference plane as it shifts from illuminating one of said two points to illuminating the other of said two points, and computing the distance from said transmitter to said detector based on the height difference between said two points and said included vertical angle.

9. The laser reference system of claim 6, in which said processor is adapted to determine the distance from said detector to said first transmitter axis in a direction generally perpendicular to said alignment direction by:

illuminating the center of the detector line with the reference plane horizontal in the direction of said second transmitter axis, tilting the reference plane in the direction of said second transmitter axis until a point on the detector line, vertically displaced from the center of the detector line, is illuminated, determining the angle by which the reference plane is tilted in the direction of said second transmitter axis, and computing the distance from said detector to said first transmitter axis in a direction generally perpendicular to said alignment direction based on the height difference between the center of the detector line and the point on the detector line that is vertically displaced from the center of the detector line, and on said angle by which the reference plane is tilted.

10. The laser reference system of claim 6 in which said rake angle is calculated as the arctangent of the ratio of said distance between said detector and said first transmitter axis in a direction generally perpendicular to said alignment direction to said distance in an alignment direction from said transmitter to said detector.

11. A method of orienting a reference plane of laser light generated by a transmitter, the transmitter including a positioning arrangement that adjusts the angular orientation of the reference plane with respect to a first transmitter axis and with respect to a second transmitter axis perpendicular thereto, the laser light being detected along a generally vertical detector line defined by a detector, with the detector also including a transmitter that transmits information regarding the location of said laser light, comprising the steps of:

determining the distance in an alignment direction between said transmitter and said detector, determining the distance from said detector to said first transmitter axis in a direction generally perpendicular to said alignment direction, and calculating a rake angle between said first transmitter axis and the alignment direction.

12. The method of orienting a reference plane of laser light of claim 11 in which the step of determining the distance in an alignment direction between said transmitter and said detector comprises the steps of directing said light in succession to illuminate two points spaced vertically along said detector line, determining the included vertical angle of the reference plane as it shifts from illuminating one of said two points to illuminating the other of said two points, and computing the distance from said transmitter to said detector based on the height difference between said two points and said included vertical angle.

13. The method of orienting a reference plane of laser light of claim 11 in which the step of determining the distance from said detector to said first transmitter axis in a direction generally perpendicular to said alignment direction comprises the steps of:

illuminating the center of the detector line with the reference plane horizontal in the direction of said second transmitter axis, tilting the reference plane in the direction of said second transmitter axis until a point on the detector line, vertically displaced from the center of the detector line, is illuminated, determining the angle by which the reference plane is tilted in the direction of said second transmitter axis, and computing the distance from said detector to said first transmitter axis in a direction generally perpendicular to said alignment direction based on the height difference between the center of the detector line and the point on the detector line that is vertically displaced from the center of the detector line, and on said angle by which the reference plane is tilted.

14. The method of orienting a reference plane of laser light of claim 11 in which the step of calculating the rake angle between said first transmitter axis and the alignment direction comprises the step determining the arctangent of the ratio of said distance from said detector to said first transmitter axis in a direction generally perpendicular to said alignment direction to said distance in an alignment direction between said transmitter and said detector.

15. The method of orienting a reference plane of laser light according to claim 11, in which the step of orienting said reference plane with respect to said first and second transmitter axes such that a desired orientation with respect to said alignment direction and a direction perpendicular thereto is achieved, comprises the step of orienting said reference plane with respect to said first and second transmitter axes according to the equations:

$$x = x' \cos(\theta) - y' \sin(\theta), \text{ and}$$

$$y = x' \sin(\theta) + y' \cos(\theta),$$

where x' and y' are the desired grades in the alignment direction and a direction perpendicular thereto, and x and y are the grades in the first and second transmitter axes.

16. A method of orienting a reference plane of laser light generated by a transmitter, the transmitter including a positioning arrangement that adjusts the angular orientation of the reference plane with respect to a first transmitter axis and with respect to a second transmitter axis perpendicular thereto, the laser light being detected along a generally vertical detector line defined by a detector, with the detector also including a transmitter that transmits information regarding the location of said laser light, comprising the steps of:

defining an alignment direction from said transmitter by positioning a detector in said alignment direction for illumination with said plane of laser light;

tilting said reference plane in a direction of said first transmitter axis while keeping said plane horizontal in a direction of said second transmitter axis;

effectively rotating said plane of laser light such that a predetermined point on said detector line is illuminated at two effective angular positions of rotation of said plane;

determining a mid-point between said two effective angular positions as said first transmitter axis, and determining an angular position at ninety degrees thereto as said second transmitter axis;

determining the angular difference between said alignment direction and said first transmitter axis as a rake angle; and orienting said reference plane with respect to said first and second transmitter axes such that a desired orientation with respect to said alignment direction and a direction perpendicular thereto is achieved.

17. The method of orienting a reference plane of laser light according to claim 16, in which the step of orienting said reference plane with respect to said first and second transmitter axes such that a desired orientation with respect to said alignment direction and a direction perpendicular thereto is achieved, comprises the step of orienting said reference plane with respect to said first and second transmitter axes according to the equations:

$$x = x' \cos(\theta) - y' \sin(\theta), \text{ and}$$

$$y = x' \sin(\theta) + y' \cos(\theta),$$

where x' and y' are the desired grades in the alignment direction and a direction perpendicular thereto, and x and y are the grades in the first and second transmitter axes.

18. A method of orienting a reference plane of laser light generated by a transmitter, the transmitter including a positioning arrangement that adjusts the angular orientation of the reference plane with respect to a first transmitter axis and with respect to a second transmitter axis perpendicular thereto, the laser light being detected along a generally vertical detector line defined by a detector, with the detector also including a transmitter that transmits information regarding the location of said laser light, comprising the steps of:

defining an alignment direction from said transmitter by positioning a detector in said alignment direction for illumination with said plane of laser light;

tilting said reference plane and determining a grade $x_1$ in a direction of said first transmitter axis and a grade $y_1$ in a direction of said second transmitter axis which cause specific point on said generally vertical detector line to be illuminated;

tilting said reference plane and determining a grade $x_2$ in a direction of said first transmitter axis and a grade $y_2$ in a direction of said second transmitter axis which cause said specific point on said generally vertical detector line to be illuminated;

calculating a rake angle between said first transmitter axis and the alignment direction; and orienting said reference plane with respect to said first and second transmitter axes such that a desired orientation with respect to said alignment direction and a direction perpendicular thereto is achieved.

19. The method of orienting a reference plane of laser light according to claim 18, in which the step of calculating the rake angle θ between said first transmitter axis and said alignment direction includes the step of calculating the rake angle according to the equation:

$$\theta = arctan((y_1 - y_2)/(x_1 - x_2)).$$

20. The method of orienting a reference plane of laser light according to claim 18, in which the step of calculating the rake angle θ between said first transmitter axis and said alignment direction includes the step of calculating the rake angle according to the equation:

$$\theta = arctan(-(x_1 - x_2)/(y_1 - y_2)).$$

21. The method of orienting a reference plane of laser light according to claim 18, in which the step of orienting said reference plane with respect to said first and second transmitter axes such that a desired orientation with respect to said alignment direction and a direction perpendicular thereto is achieved, comprises the step of orienting said reference plane with respect to said first and second transmitter axes according to the equations:

$$x = x' \cos(\theta) - y' \sin(\theta), \text{ and}$$

$$y = x' \sin(\theta) + y' \cos(\theta),$$

where x' and y' are the desired grades in the alignment direction and a direction perpendicular thereto, and x and y are the grades in the first and second transmitter axes.

22. A method of orienting a reference plane of laser light generated by a transmitter, the transmitter including a positioning arrangement that adjusts the angular orientation of the reference plane with respect to a first transmitter axis and with respect to a second transmitter axis perpendicular thereto, the laser light being directed at a target that extends generally vertically along a target line, comprising the steps of:

determining the distance in an alignment direction between said transmitter and said target, determining the distance from said target to said first transmitter axis in a direction generally perpendicular to said alignment direction, and calculating a rake angle between said first transmitter axis and the alignment direction.

23. The method of orienting a reference plane of laser light of claim 22 in which the step of determining the distance in an alignment direction between said transmitter and said target comprises the steps of directing said light in succession to illuminate two points spaced vertically along said target line, determining the included vertical angle of the reference plane as it shifts from illuminating one of said two points to illuminating the other of said two points, and computing the distance from said transmitter to said target based on the height difference between said two points and said included vertical angle.

24. The method of orienting a reference plane of laser light of claim 22 in which the step of determining the distance from said target to said first transmitter axis in a direction generally perpendicular to said alignment direction comprises the steps of:

illuminating the center of the target line with the reference plane horizontal in the direction of said second transmitter axis, tilting the reference plane in the direction of said second transmitter axis until a point on the target line, vertically displaced from the center of the target line, is illuminated, determining the angle by which the reference plane is tilted in the direction of said second transmitter axis, and computing the distance from said target to said first transmitter axis in a direction generally perpendicular to said alignment direction based on the height difference between the center of the target line and the point on the target line that is vertically displaced from the center of the target line, and on said angle by which the reference plane is tilted.

25. The method of orienting a reference plane of laser light of claim 22 in which the step of calculating the rake angle between said first transmitter axis and the alignment direction comprises the step determining the arctangent of the ratio of said distance from said target to said first transmitter axis in a direction generally perpendicular to said alignment direction to said distance in an alignment direction between said transmitter and said target.

26. The method of orienting a reference plane of laser light according to claim 22, in which the step of orienting said reference plane with respect to said first and second transmitter axes such that a desired orientation with respect to said alignment direction and a direction perpendicular thereto is achieved, comprises the step of orienting said reference plane with respect to said first and second transmitter axes according to the equations:

$$x = x' \cos(\theta) - y' \sin(\theta), \text{ and}$$

$$y = x' \sin(\theta) + y' \cos(\theta),$$

where x' and y' are the desired grades in the alignment direction and a direction perpendicular thereto, and x and y are the grades in the first and second transmitter axes.

27. A method of orienting a reference plane of laser light generated by a transmitter, the transmitter including a positioning arrangement that adjusts the angular orientation of the reference plane with respect to a first transmitter axis and with respect to a second transmitter axis perpendicular thereto, the laser light being detected along a generally vertical target line defined by a target, comprising the steps of:

defining an alignment direction from said transmitter by positioning a target in said alignment direction for illumination with said plane of laser light;

tilting said reference plane in a direction of said first transmitter axis while keeping said plane horizontal in a direction of said second transmitter axis;

effectively rotating said plane of laser light such that a predetermined point on said target line is illuminated at two effective angular positions of rotation of said plane;

determining a mid-point between said two effective angular positions as said first transmitter axis, and determining an angular position at ninety degrees thereto as said second transmitter axis;

determining the angular difference between said alignment direction and said first transmitter axis as a rake angle; and orienting said reference plane with respect to said first and second transmitter axes such that a desired orientation with respect to said alignment direction and a direction perpendicular thereto is achieved.

28. The method of orienting a reference plane of laser light according to claim 27, in which the step of orienting said reference plane with respect to said first and second transmitter axes such that a desired orientation with respect to said alignment direction and a direction perpendicular thereto is achieved, comprises the step of orienting said reference plane with respect to said first and second transmitter axes according to the equations:

$$x = x' \cos(\theta) - y' \sin(\theta), \text{ and}$$

$$y = x' \sin(\theta) + y' \cos(\theta),$$

where x' and y' are the desired grades in the alignment direction and a direction perpendicular thereto, and x and y are the grades in the first and second transmitter axes.

29. A method of orienting a reference plane of laser light generated by a transmitter, the transmitter including a positioning arrangement that adjusts the angular orientation of the reference plane with respect to a first transmitter axis and with respect to a second transmitter axis perpendicular thereto, the laser light being detected along a generally vertical target line defined by a target, with the target also including a transmitter that transmits information regarding the location of said laser light, comprising the steps of:

defining an alignment direction from said transmitter by positioning a target in said alignment direction for illumination with said plane of laser light;

tilting said reference plane and determining a grade $x_1$ in a direction of said first transmitter axis and a grade $y_1$ in a direction of said second transmitter axis which cause specific point on said generally vertical target line to be illuminated;

tilting said reference plane and determining a grade $x_2$ in a direction of said first transmitter axis and a grade $y_2$ in a direction of said second transmitter axis which cause said specific point on said generally vertical target line to be illuminated;

calculating a rake angle between said first transmitter axis and the alignment direction; and orienting said reference plane with respect to said first and second transmitter axes such that a desired orientation with respect to said alignment direction and a direction perpendicular thereto is achieved.

30. The method of orienting a reference plane of laser light according to claim 29, in which the step of calculating the rake angle θ between said first transmitter axis and said alignment direction includes the step of calculating the rake angle according to the equation:

$$\theta = arctan((y_1-y_2)/(x_1-x_2)).$$

31. The method of orienting a reference plane of laser light according to claim 29, in which the step of calculating the rake angle θ between said first transmitter axis and said alignment direction includes the step of calculating the rake angle according to the equation:

$$\theta = arctan(-(x_1-x_2)/(y_1-y_2)).$$

32. The method of orienting a reference plane of laser light according to claim 29, in which the step of orienting said reference plane with respect to said first and second transmitter axes such that a desired orientation with respect to said alignment direction and a direction perpendicular thereto is achieved, comprises the step of orienting said reference plane with respect to said first and second transmitter axes according to the equations:

$$x = x' \cos(\theta) - y' \sin(\theta), \text{ and}$$

$$y = x' \sin(\theta) + y' \cos(\theta),$$

where x' and y' are the desired grades in the alignment direction and a direction perpendicular thereto, and x and y are the grades in the first and second transmitter axes.

* * * * *